Figure 1:
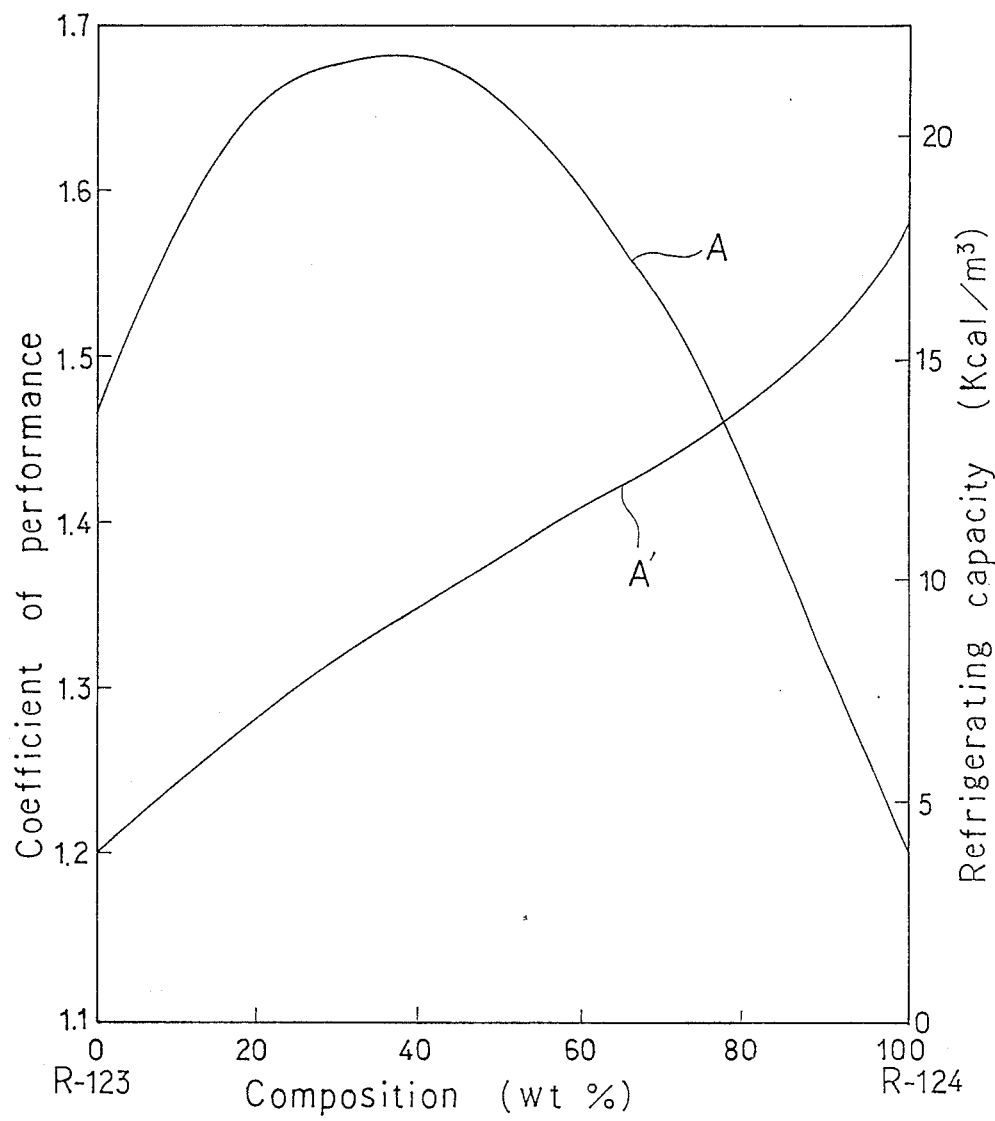

United States Patent [19]

Tamura et al.

[11] Patent Number: 4,957,652
[45] Date of Patent: Sep. 18, 1990

[54] REFRIGERANTS

[75] Inventors: Kohji Tamura, Kawanishi; Hiroshi Kashiwagi, Settsu; Masahiro Noguchi, Osaka, all of Japan

[73] Assignee: Daikin Industries, Ltd., Osaka, Japan

[21] Appl. No.: 259,144

[22] Filed: Oct. 18, 1988

[30] Foreign Application Priority Data

Oct. 19, 1987 [JP] Japan .................................. 62-264700

[51] Int. Cl.⁵ .............................................. C09K 5/04
[52] U.S. Cl. .......................................... 252/67; 62/114
[58] Field of Search ............................ 252/67; 62/114

[56] References Cited

U.S. PATENT DOCUMENTS 4,766,260  8/1988  Manzer et al. ........................ 570/168

Primary Examiner—Paul Lieberman
Assistant Examiner—Christine A. Skane
Attorney, Agent, or Firm—Larson and Taylor

[57] ABSTRACT

A refrigerant comprising (1) dichlorotrifluoroethane and (2) at least one compound selected from the group consisting of chlorotetrafluoroethane, pentafluoroethane, tetrafluoroethane, 1-chloro-1,1-difluoroethane, 1,1,1-trifluoroethane and 1,1-difluoroethane.

5 Claims, 6 Drawing Sheets

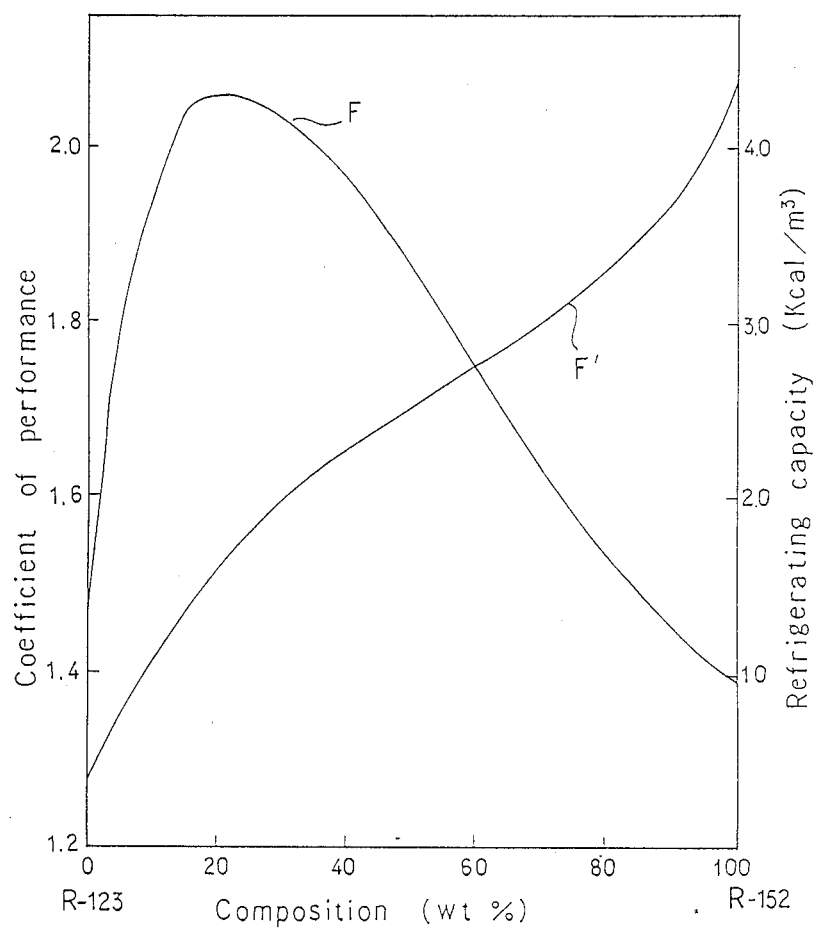

REFRIGERANTS

This invention relates to a working fluid for a refrigerator, namely a refrigerant.

Refrigerants heretofore known include chlorofluoroalkanes, fluoroalkanes, azeotropic compositions thereof and like compositions which are generally called CFCs. In recent years, however, it has been suggested that fully halogenated CFCs, i.e. fully halogen-substituted alkanes, released into the atmosphere would deplete the stratospheric ozone layer, thereby inflicting a serious adverse influence on the ecosystem including humans on the earth. A worldwide agreement, "The Montreal Protocol," signed in September 1987, calls for a restriction of consumption and production of the major ozone-depleting CFCs. Among the CFCs to be controlled for the restriction is trichlorofluoromethane (hereinafter referred to as "R-11") With the spread of refrigerators and air-conditioning systems, the control over the use and production of CFCs enjoying an annually increasing demand greatly affects our residential environment and the current social framework as a whole. In consequence, there is an urgent demand for development of novel refrigerants with a high refrigerating performance, particularly a high coefficient of performance, which can be substituted for R-11. Dichlorotrifluoroethane is a promising candidate substitute for R-11 to minimize ozone depletion, but has a low refrigerating performance in comparison with R-11.

We conducted extensive research to develop novel refrigerants which have a high coefficient of performance and which, if released into the atmosphere, would exert little influence on the ozone layer. Our research revealed that when a certain class of CFC compound is mixed with dichlorotrifluoroethane, a refrigerant can be obtained which can exhibit a higher coefficient of performance than trichlorofluoroethane.

The present invention provides a refrigerant comprising (1) dichlorotrifluoroethane and (2) at least one compound selected from the group consisting of chlorotetrafluoroethane, pentafluoroethane, tetrafluoroethane, 1-chloro-1,1-difluoroethane, 1,1,1-trifluoroethane and 1,1-difluoroethane.

The present invention will be described blow in more detail with reference to, when required, the accompanying drawings.

FIGS. 1 to 6 show graphs indicative of the refrigerating capacity of the refrigerants according to the invention.

A preferred class of refrigerant composition according to the invention comprises (1) about 10 to about 97% by weight of dichlorotrifluoroethane and (2) about 90 to about 3% by weight of at least one compound selected from the group consisting of chlorotetrafluoroethane, pentafluoroethane (R-125), tetrafluoroethane, 1-chloro1,1-difluoroethane (R-142b), 1,1,1-trifluoroethane (R143a) and 1,1-difluoroethane (R-152a). The refrigerants containing the CFC compounds (1) and (2) in said range of ratio exhibit a higher coefficient of performance than dichlorofluoroethane singly used. Of refrigerants composed of dichlorotrifluoroethane and chlorotetrafluoroethane or 1-chloro-1,1-difluoroethane, a preferred one comprises about 40 to about 90% by weight of the former and about 60 to about 10% by weight of the latter. Of refrigerants composed of dichlorotrifluoroethane and pentafluoroethane, a preferred one comprises about 20 to about 97% by weight of the former and about 80 to about 3% by weight of the latter. Of refrigerants composed of dichlorotrifluoroethane and tetrafluoroethane, a preferred one comprises about 25 to about 97% by weight of the former and about 75 to about 3% by weight of the latter. Of refrigerants composed of dichlorotrifluoroethane and 1,1,1-trifluoroethane, a preferred one comprises about 30 to about 97% by weight of the former and about 70 to about 3% by weight of the latter. Of refrigerants composed of dichlorotrifluoroethane and 1,1-difluoroethane, a preferred one comprises about 40 to about 97% by weight of the former and about 60 to about 3% by weight of the latter. The refrigerants having these preferred compositions can display a higher coefficient of performance than R-11.

Examples of dichlorotrifluoroethane to be used in the invention are 1,1-dichloro-2,2,2-trifluoroethane (R-123), 1,2-dichloro-1,1,2-trifluoroethane (R-123a) and 1,1-dichloro-1,2,2-trifluoroethane (R-123b). Examples of chlorotetrafluoroethane for use herein are 2-chloro1,1,1,2-tetrafluoroethane (R-124) and 1-chloro-1,1,2,2tetrafluoroethane (R-124a). Examples of tetrafluoroethane for use herein are 1,1,1,2-tetrafluoroethane (R-134a) and 1,1,2,2-tetrafluoroethane (R-134). Among these examples, R-123 and R-123a or R-123b can achieve an equivalent effect in the composition of the invention and thus can be replaced by each other or mixed with each other in use. Similar use can be made of R-124 and R-124a and also R134a and R-134.

The refrigerants of the invention are smaller in the ratio of specific heat and lower in the temperature of gas discharged from the compressor than chlorodifluoromethane (R-22) and are therefore suitable for use as a cooling medium for a refrigeration cycle using a relatively high temperature as in an air-conditioning equipment of the heat pump type.

The composition of the invention can utilize the feature of non-azeotropic mixture. Generally a single compound or an azeotrope is vaporized at a constant temperature in an evaporator because of its evaporation under constant pressure, whereas a non-azeotropic mixture has a low temperature at the inlet of the evaporator and a high temperature at the outlet thereof. On the other hand, a fluid to be cooled is caused to flow in countercurrent to the refrigerant in the evaporator to undergo heat exchange and thus has a temperature gradient along the flow direction even if the refrigerant is vaporized at a constant temperature. In other words, a temperature difference between the refrigerant and the fluid to be cooled diminishes in the evaporator as the fluid flows forwardly. In use, the composition of the invention can be rendered close in temperature to the temperature gradient of the fluid to be cooled in the evaporator, so that the refrigeration efficiency, namely the coefficient of performance, can be enhanced.

The features of the invention will be clarified below with reference to the following Examples and Comparison Example.

EXAMPLES 1 to 6 AND COMPARISON EXAMPLE 1

Refrigerants were prepared by mixing together R-123 and R-124 in the various proportions shown below in Table 1 (weight ratio).

A refrigerator was operated with an output of 1 hp. using the refrigerants of the composition shown below in Table 1. Each refrigerant started condensation at 50° C. in a condenser and had a temperature of −50° C. in the inlet of the evaporator with a superheat degree of 5° C. Table 1 shows the maximum evaporating temperature (°C.), refrigerating capacity (kcal/m³), coefficient of performance and discharge temperature (°C.) at the compressor.

Table 1 also shows the results achieved by using R-123 alone (Comparison Example 1).

FIG. 1 indicates graphs each illustrating the relationship between the proportions of R-123 and R-124 and the coefficient of performance (curve A) and the relationship between the proportions thereof and the refrigerating capacity (curve A'), respectively.

Table 1 and FIG. 1 reveal that the refrigerants of the present invention have outstanding properties.

TABLE 1

| Refrigerant | Composition of refrigerant (wt. %) R-123 | Composition of refrigerant (wt. %) R-124 | Maximum evaporating temperature (°C.) | Refrigerating capacity (kcal/m³) | Coefficient of performance | Discharge temperature at compressor (°C.) |
|---|---|---|---|---|---|---|
| Comparison Example 1 | 100 | 0 | −50.0 | 3.89 | 1.47 | 74.9 |
| Example 1 | 97 | 3 | −48.9 | 4.36 | 1.51 | 73.7 |
| Example 2 | 80 | 20 | −45.1 | 6.81 | 1.65 | 69.2 |
| Example 3 | 60 | 40 | −43.5 | 9.41 | 1.68 | 65.9 |
| Example 4 | 40 | 60 | −43.8 | 11.7 | 1.60 | 63.6 |
| Example 5 | 20 | 80 | −45.7 | 14.0 | 1.43 | 61.2 |
| Example 6 | 10 | 90 | −47.5 | 15.5 | 1.32 | 59.2 |

EXAMPLES 7 TO 12

The properties of refrigerants were investigated in the same manner as in Examples 1 to 6 with the exception of using the refrigerants prepared by mixing together R-123 and R-125 in the various proportions (weight ratio) shown below in Table 2.

Table 2 shows the maximum evaporating temperature (°C.), refrigerating capacity (kcal/m³), coefficient of performance and discharge temperature (°C.) at the compressor in respect of the refrigerants.

Figure 2:
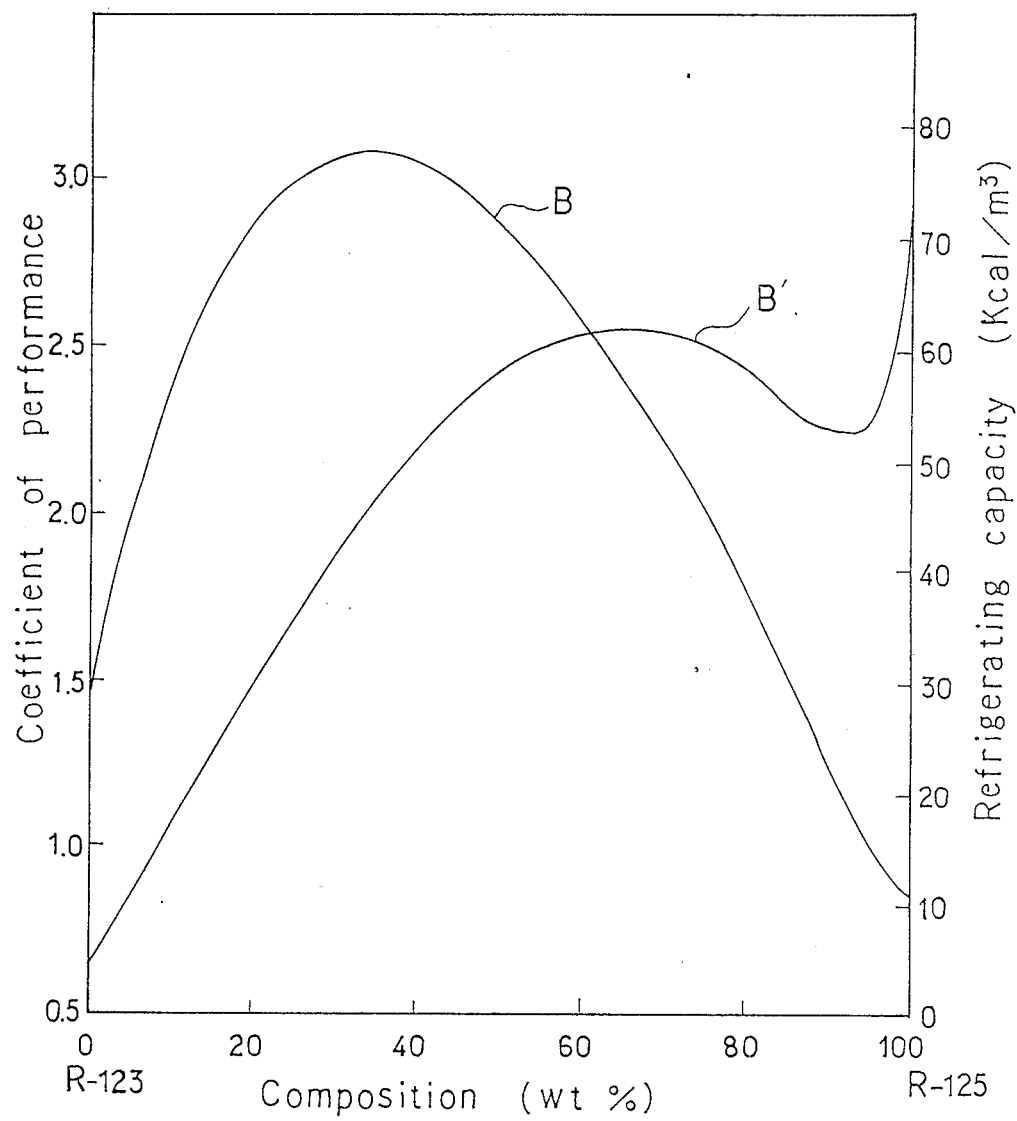

FIG. 2 indicates graphs each illustrating the relationship between the proportions of R-123 and R-125 and the coefficient of performance (curve B) and the relationship between the proportions thereof and the refrigerating capacity (curve B'), respectively.

TABLE 2

| Refrigerant | Composition of refrigerant (wt. %) R-123 | Composition of refrigerant (wt. %) R-125 | Maximum evaporating temperature (°C.) | Refrigerating capacity (kcal/m³) | Coefficient of performance | Discharge temperature at compressor (°C.) |
|---|---|---|---|---|---|---|
| Example 7 | 97 | 3 | −41.7 | 7.69 | 1.84 | 70.0 |
| Example 8 | 80 | 20 | −25.2 | 29.5 | 2.88 | 64.4 |
| Example 9 | 60 | 40 | −20.3 | 51.2 | 3.06 | 65.0 |
| Example 10 | 40 | 60 | −22.8 | 61.2 | 2.61 | 68.9 |
| Example 11 | 20 | 80 | −31.5 | 58.1 | 1.79 | 76.7 |
| Example 12 | 10 | 90 | −38.9 | 53.1 | 1.28 | 82.0 |

EXAMPLE 13 TO 18

The properties of refrigerants were investigated in the same manner as in Examples 1 to 6 with the exception of using the refrigerants prepared by mixing together R-123 and R-134a in the various proportions (weight ratio) shown below in Table 3.

Table 3 shows the maximum evaporating temperature (°C.), refrigerating capacity (kcal/m³), coefficient of performance and discharge temperature (°C.) at the compressor in respect of the refrigerants.

Figure 3:
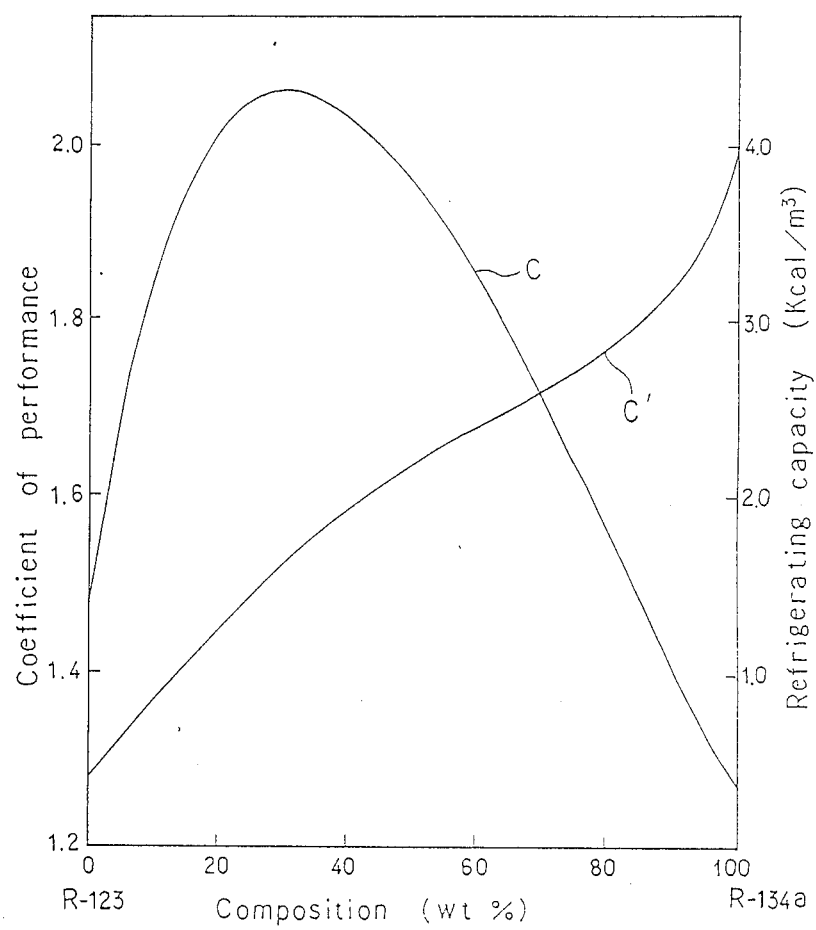

FIG. 3 indicates graphs each illustrating the relationship between the proportions of R-123 and R-134a and the coefficient of performance (curve C) and the relationship between the proportions thereof and the refrigerating capacity (curve C'), respectively.

TABLE 3

| Refrigerant | Composition of refrigerant (wt. %) R-123 | Composition of refrigerant (wt. %) R-134a | Maximum evaporating temperature (°C.) | Refrigerating capacity (kcal/m³) | Coefficient of performance | Discharge temperature at compressor (°C.) |
|---|---|---|---|---|---|---|
| Example 13 | 97 | 3 | −46.5 | 5.39 | 1.62 | 73.3 |
| Example 14 | 80 | 20 | −38.3 | 12.7 | 2.02 | 72.5 |
| Example 15 | 60 | 40 | −36.3 | 19.3 | 2.04 | 75.4 |
| Example 16 | 40 | 60 | −37.9 | 24.1 | 1.85 | 79.8 |
| Example 17 | 20 | 80 | −42.2 | 28.4 | 1.56 | 84.3 |
| Example 18 | 10 | 90 | −45.4 | 31.8 | 1.40 | 85.3 |

EXAMPLE 19 TO 24

The properties of refrigerants were investigated in the same manner as in Examples 1 to 6 with the exception of using the refrigerants prepared by mixing together R-123 and R-142b in the various proportions (weight ratio) shown below in Table 4.

Table 4 shows the maximum evaporating temperature (°C.), refrigerating capacity (kcal/m³), coefficient of performance and discharge temperature (°C.) at the compressor in respect of the refrigerants.

Figure 4:
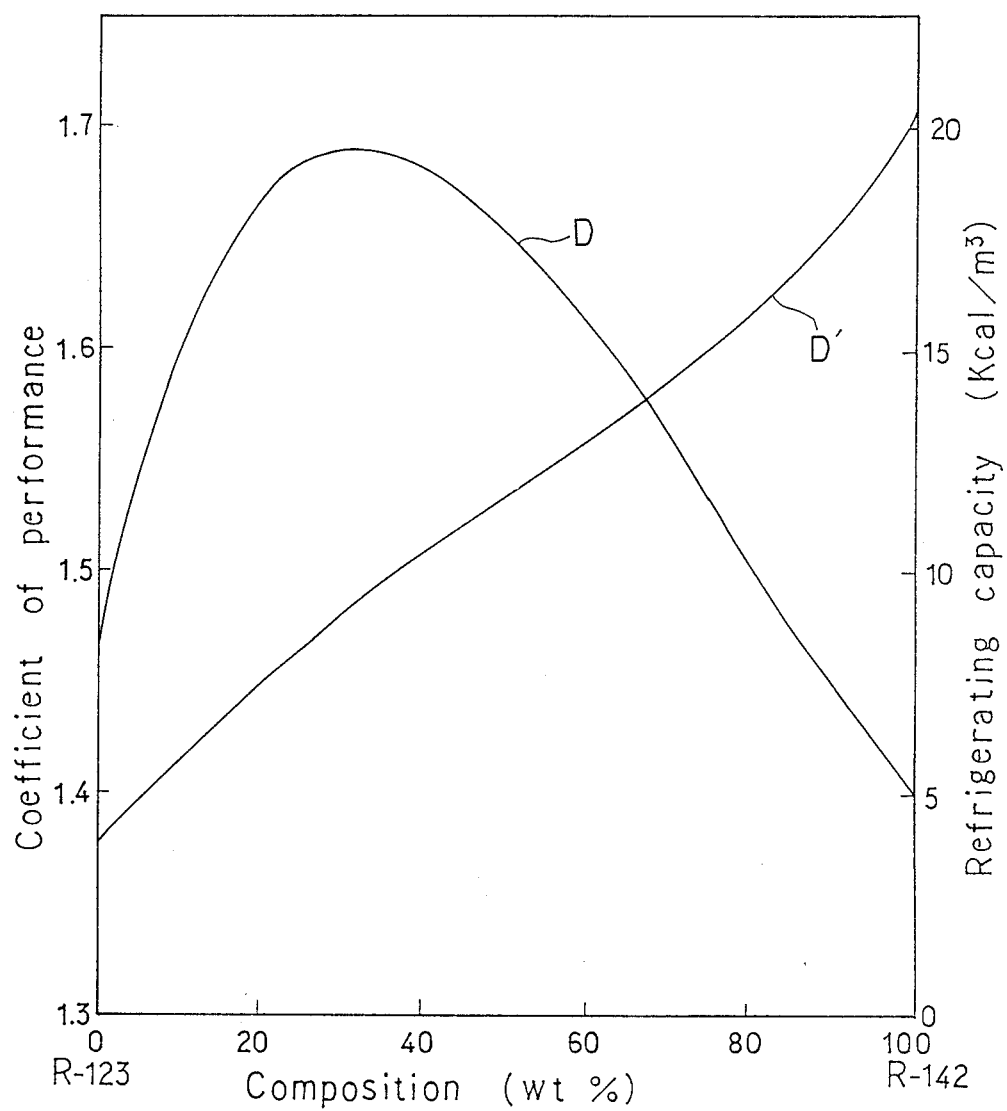

FIG. 4 indicates graphs each illustrating the relationship between the proportions of R-123 and R-142b and the coefficient of performance (curve D) and the relationship between the proportions thereof and the refrigerating capacity (curve D'), respectively.

TABLE 4

| Refrigerant | Composition of refrigerant (wt. %) | | Maximum evaporating temperature (°C.) | Refrigerating capacity (kcal/m³) | Coefficient of performance | Discharge temperature at compressor (°C.) |
| --- | --- | --- | --- | --- | --- | --- |
| | R-123 | R-142b | | | | |
| Example 19 | 97 | 3 | −48.7 | 4.49 | 1.52 | 74.4 |
| Example 20 | 80 | 20 | −44.7 | 7.47 | 1.67 | 75.6 |
| Example 21 | 60 | 40 | −43.6 | 10.4 | 1.68 | 77.9 |
| Example 22 | 40 | 60 | −44.2 | 13.1 | 1.61 | 80.3 |
| Example 23 | 20 | 80 | −46.3 | 16.0 | 1.50 | 81.6 |
| Example 24 | 10 | 90 | −47.8 | 17.8 | 1.45 | 81.3 |

EXAMPLES 25 TO 30

The properties of refrigerants were investigated in the same manner as in Examples 1 to 6 with the exception of using the refrigerants prepared by mixing together R-123 and R-143a in the various proportions (weight ratio) shown below in Table 5.

Table 5 shows the maximum evaporating temperature (°C.), refrigerating capacity (kcal/m³), coefficient of performance and discharge temperature (°C.) at the compressor in respect of the refrigerants.

Figure 5:
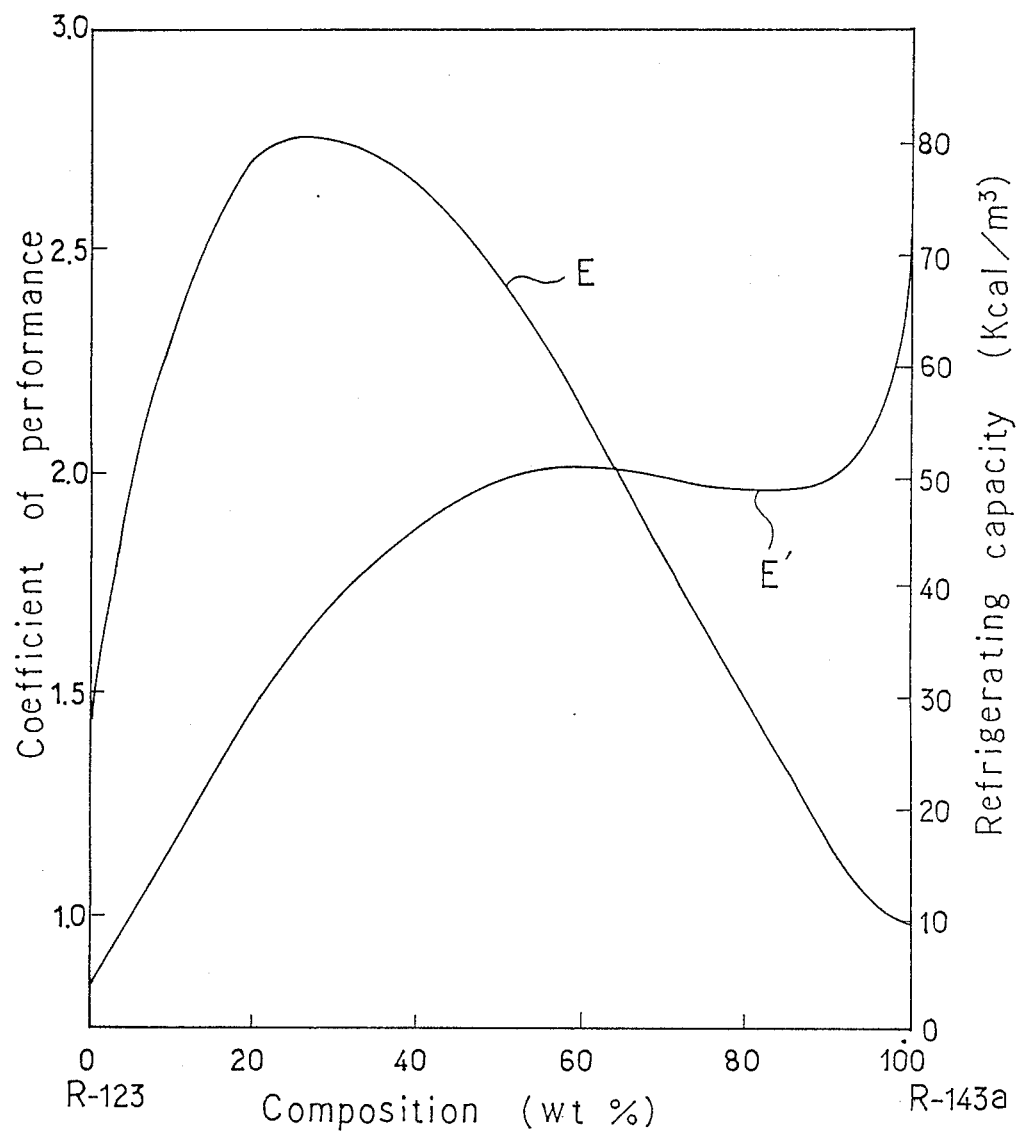

FIG. 5 indicates graphs each illustrating the relationship between the proportions of R-123 and R-143a and the coefficient of performance (curve E) and the relationship between the proportions thereof and the refrigerating capacity (curve E'), respectively.

TABLE 5

| Refrigerant | Composition of refrigerant (wt. %) | | Maximum evaporating temperature (°C.) | Refrigerating capacity (kcal/m³) | Coefficient of performance | Discharge temperature at compressor (°C.) |
| --- | --- | --- | --- | --- | --- | --- |
| | R-123 | R-143a | | | | |
| Example 25 | 97 | 3 | −41.6 | 7.87 | 1.85 | 70.4 |
| Example 26 | 80 | 20 | −26.7 | 30.0 | 2.71 | 67.8 |
| Example 27 | 60 | 40 | −24.3 | 45.4 | 2.64 | 71.3 |
| Example 28 | 40 | 60 | −28.2 | 50.9 | 2.14 | 77.7 |
| Example 29 | 20 | 80 | −36.2 | 49.1 | 1.50 | 86.2 |
| Example 30 | 10 | 90 | −41.8 | 49.2 | 1.18 | 88.8 |

EXAMPLES 31 TO 36

The properties of refrigerants were investigated in the same manner as in Examples 1 to 6 with the exception of using the refrigerants prepared by mixing together R-123 and R-152a in the various proportions (weight ratio) shown below in Table 6.

Table 6 shows the maximum evaporating temperature (°C.), refrigerating capacity (kcal/m³), coefficient of performance and discharge temperature (°C.) at the compressor in respect of the refrigerants.

FIG. 6 indicates graphs each illustrating the relationship between the proportions of R-123 and R-152a and the coefficient of performance (curve F) and the relationship between the proportions thereof and the refrigerating capacity (curve F'), respectively.

TABLE 6

| Refrigerant | Composition of refrigerant (wt. %) | | Maximum evaporating temperature (°C.) | Refrigerating capacity (kcal/m³) | Coefficient of performance | Discharge temperature at compressor (°C.) |
| --- | --- | --- | --- | --- | --- | --- |
| | R-123 | R-152a | | | | |
| Example 31 | 97 | 3 | −44.7 | 6.30 | 1.70 | 73.6 |
| Example 32 | 80 | 20 | −36.3 | 16.2 | 2.07 | 78.7 |
| Example 33 | 60 | 40 | −36.3 | 23.0 | 1.96 | 87.6 |
| Example 34 | 40 | 60 | −39.2 | 27.7 | 1.74 | 96.0 |
| Example 35 | 20 | 80 | −43.6 | 33.1 | 1.53 | 101.7 |
| Example 36 | 10 | 90 | −46.5 | 37.4 | 1.45 | 102.2 |

We claim:

1. A refrigerant comprising (1) about 10 to about 97% by weight of dichlorotrifuloroethane and (2) about 90 to about 3% by weight of at least one compound selected from the group consisting of 1,1,1,2-tetrafluoroethane, 1,1,2,2-tetrafluoroethane, 1-chloro-1,1-difluoroethane, 1,1,1-trifluoroethane and 1,1-difluoroethane.

2. A refrigerant according to claim 1 which comprises about 40 to about 90% by weight of dichlorotrifluoroethane and about 60 to about 10% by weight of 1-chloro-1,1-difluoroethane.

3. A refrigerant according to claim 1 which comprises about 25 to about 97% by weight of dichlorotrifluoroethane and about 75 to about 3% by weight of at least one compound selected from 1,1,1,2-tetrafluoroethane and 1,1,2,2,-tetrafluoroethane.

4. A refrigerant according to claim 1 which comprises about 30 to about 97% by weight of dichlorotrifluoroethane and about 70 to about 3% by weight of 1,1,1-trifluoroethane.

5. A refrigerant according to claim 2 which comprises about 40 to about 97% by weight of dichlorotrifluoroethane and about 60 to about 3% by weight of 1,1-difluoroethane.

* * * * *